(12) United States Patent
Fujioka et al.

(10) Patent No.: US 10,295,336 B2
(45) Date of Patent: May 21, 2019

(54) ELEMENT PROVIDED WITH PORTION FOR POSITION DETERMINATION AND MEASURING METHOD

(71) Applicant: NALUX CO., LTD., Osaka-shi, Osaka (JP)

(72) Inventors: Takahiro Fujioka, Osaka (JP); Atsuya Fushiki, Osaka (JP); Hironori Horikiri, Osaka (JP); Katsumoto Ikeda, Osaka (JP)

(73) Assignee: NALUX CO., LTD., Osaka-Shi, Osaka (JP)

(*) Notice: Subject to any disclaimer, the term of this patent is extended or adjusted under 35 U.S.C. 154(b) by 0 days.

(21) Appl. No.: 15/685,359

(22) Filed: Aug. 24, 2017

(65) Prior Publication Data

US 2017/0350695 A1    Dec. 7, 2017

Related U.S. Application Data

(63) Continuation of application No. PCT/JP2016/051696, filed on Jan. 21, 2016.
(Continued)

(51) Int. Cl.
*G02B 3/00* (2006.01)
*G02B 5/04* (2006.01)
(Continued)

(52) U.S. Cl.
CPC ............... *G01B 11/26* (2013.01); *G02B 3/00* (2013.01); *G02B 5/04* (2013.01); *G01B 11/002* (2013.01); *G02B 2003/0093* (2013.01)

(58) Field of Classification Search
CPC .................... G01B 11/26; G02B 5/04
(Continued)

(56) References Cited

U.S. PATENT DOCUMENTS 4,837,449 A * 6/1989 Maltby, Jr. .......... G01B 11/2433
                                                  250/559.11
5,767,960 A * 6/1998 Orman ................. G01B 11/002
                                                  356/139.03
(Continued)

FOREIGN PATENT DOCUMENTS

JP    2008-216905 A    9/2008
JP    2014-137410 A    7/2014
JP    2014-160111 A    9/2014

OTHER PUBLICATIONS

International Search Report & Written Opinion dated Apr. 19, 2016 corresponding to International Patent Application No. PCT/JP2016/051696, and English translation thereof.

*Primary Examiner* — Shawn Decenzo
(74) *Attorney, Agent, or Firm* — Squire Patton Boggs (US) LLP

(57) ABSTRACT

The element according to the present invention has a first plane (201) and a second plane (203) forming a prescribed angle with the first plane. The second plane is provided with at least three portions for position determination (101A, 101B, 101C, 101D) arranged on the second plane sufficiently spaced apart from each other, allowing the identification of the second plane. Each portion for position determination is formed in a convex shape with respect to the second plane. A tangential plane (TL) to the surface of each portion for position determination at a point on a border line between the second plane and the surface forms a single plane and tangential planes of the portions for position determination are parallel to one another.

19 Claims, 10 Drawing Sheets

Related U.S. Application Data

(60) Provisional application No. 62/131,362, filed on Mar. 11, 2015.

(51) Int. Cl.
*G01B 11/00* (2006.01)
*G01B 11/26* (2006.01)

(58) Field of Classification Search
USPC .......................... 359/833, 836; 356/138–155
See application file for complete search history.

(56) References Cited

U.S. PATENT DOCUMENTS

2012/0026486 A1* 2/2012 Jeng ........................ G03F 9/703
 356/138
2018/0045603 A1* 2/2018 Fujioka .................... G06T 7/70

* cited by examiner

ELEMENT PROVIDED WITH PORTION FOR POSITION DETERMINATION AND MEASURING METHOD

CROSS REFERENCE TO RELATED APPLICATION

This is a Continuation of International Patent Application No. PCT/JP2016/051696 filed Jan. 21, 2016, and which claims priority from U.S. Provisional Patent Application No. 62/131,362, dated Mar. 11, 2015. The contents of these applications are hereby incorporated by reference.

BACKGROUND

Technical Field

The present invention relates to an element provided with portions for position determination and a measuring method.

Background Art

In an element provided with a prism surface, for example, a value of an angle that the prism surface forms with another surface through which a light beam passes has to be guaranteed with a high accuracy. Accordingly, the angle that the prism surface forms with another surface through which a light beam passes has to be measured with a high accuracy. When an angle that two surfaces of an element form is measured, conventionally the element is cut by an appropriate plane, and the angle that the two surfaces form is measured in the section. However, the conventional measuring method has the following problems. Firstly, cutting an element requires a lot of trouble. Secondly, a deformation of the element due to the cutting and burrs generated by the cutting prevent a high-accuracy measurement of the angle. Thirdly, measurement values vary depending on a section that is selected. Thus, it is difficult to measure the angle that the two surfaces form with a high accuracy by the conventional measuring method.

On the other hand, methods for aligning two elements by the use of a position marker that corresponds to a portion for position determination have been developed conventionally (Patent document 1 and Patent document 2). However, a method for measuring an angle that two surfaces of an element form by the use of portions for position determination and an element that is configured such that an angle that two surfaces of the element form can be measured by the use of portions for position determination have not been developed.

PRIOR ART DOCUMENTS

Patent Documents

Patent document 1: JP2008-216905A
Patent document 2: JP2014-137410A

SUMMARY OF INVENTION

Problem to be Solved by the Invention

Accordingly, there is a need for a method for measuring an angle that two surfaces of an element form by the use of portions for position determination and an element that is configured such that an angle that two surfaces of the element form can be measured by the use of portions for position determination.

Means for Solving the Problem

An element according to the first aspect of the present invention is an element having a first plane and a second plane that is at an angle with the first plane, wherein the second plane is provided with at least three portions for position determination thereon, the portions for position determination being arranged such that spacing between the portions for position determination is great enough to locate the second plane, and each of the portions for position determination has a convex shape on the second plane and is configured such that a tangential plane of a surface of each portion for position determination at any point on the border line between the second plane and the surface forms a single plane, an angle formed by the tangential plane and the second plane is in a range from 20 degrees to 70 degrees, and the tangential planes on the border lines of the at least three portions for position determination are parallel to one another.

In the element according to the present aspect, the position of the second plane can be determined with respect to the position of the first plane by determining the positions of the border lines of the portions for position determination, and thereby the angle that the first plane and the second plane form can be measured with a high accuracy. In other words, when in the element according to the present aspect, the angle that the first plane and the second plane form is measured, the element need not be cut by a plane for measurement of an angle. Accordingly, a lot of trouble for cutting the element is not required, the accuracy of measurement will not deteriorate because of a deformation of the element due to the cutting and burrs generated by the cutting, and measurement values will not vary depending on a section that is selected.

In an element according to the first embodiment of the first aspect of the present invention, the portions for position determination are arranged on the periphery of the second plane.

According to the present embodiment, the position of the second plane can be determined with a high accuracy through the at least three portions for position determination that are arranged on the periphery of the second plane, and thereby the angle that the first plane and the second plane form can be measured with a high accuracy.

An element according to the second embodiment of the first aspect of the present invention is provided with four portions for position determination.

An element according to the third embodiment of the first aspect of the present invention is used for optical applications.

An element according to the fourth embodiment of the first aspect of the present invention is the element according to the third embodiment wherein at least one of the first plane and the second plane is a prism plane.

An element according to the fifth embodiment of the first aspect of the present invention is the element according to the third embodiment wherein at least one of the first plane and the second plane is provided with a lens thereon.

An element according to the sixth embodiment of the first aspect of the present invention is the element according to the third embodiment wherein at least one of the first plane and the second plane is a surface for installing an optical fiber.

An element according to the seventh embodiment of the first aspect of the present invention is provided with at least three position markers, each position marker corresponding to a single portion for position determination.

An element according to the eighth embodiment of the first aspect of the present invention is the element according to the seventh embodiment wherein the length of the border line of each position marker is from 0.1 millimeters to 3.0 millimeters.

According to the present embodiment, a sufficient number of points of measurement can be arranged along the border line, each point of measurement having a size corresponding to the size of a single pixel of an image measuring system.

An element according to the ninth embodiment of the first aspect of the present invention is provided with at least two position markers including at least one position marker corresponding to plural portions for position determination.

An element according to the tenth embodiment of the first aspect of the present invention is the element according to any of the seventh to the ninth embodiments wherein the surface of each position marker including the border line is formed as a curved surface, and the radius of curvature of the surface at the border line ranges from 0.03 millimeters to 0.2 millimeters.

According to the present embodiment, a position of the border line is clearly displayed in an image thanks to reflection on the surface including the border line of each position marker.

A method for measuring an angle according to the second aspect of the present invention is a method for measuring an angle in an element having a first plane and a second plane that is at an angle with the first plane, wherein the second plane is provided with at least three portions for position determination thereon, the portions for position determination being arranged such that spacing between the portions for position determination is great enough to locate the second plane, and each of the portions for position determination has a convex shape on the second plane and is configured such that a tangential plane of a surface of each portion for position determination at any point on the border line between the second plane and the surface forms a single plane, and the tangential planes on the border lines of the at least three portions for position determination are parallel to one another. The method includes the steps of determining positions of the border lines of the at least three portions from an image of the second plane; and determining the angle between the first plane and the second plane using the positions of the at least three portions.

In the method for measuring an angle according to the present aspect, a position of the second plane can be determined with respect to the first plane by determining positions of the border lines of the at least three portions from an image of the second plane, and thereby the angle that the first plane and the second plane form can be measured with a high accuracy. In other words, in the method for measuring an angle according to the present aspect, the element need not be cut by a plane for measurement of an angle. Accordingly, a lot of trouble for cutting the element is not required, the accuracy of measurement will not deteriorate because of a deformation of the element due to the cutting and burrs generated by the cutting, and measurement values will not vary depending on a section that is selected.

In a method for measuring an angle according to the first embodiment of the second aspect of the present invention, the positions of the border lines of the at least three portions are obtained using plural pixels in the image.

According to the present embodiment, the positions of the border lines of the at least three portions are obtained using plural pixels in the image, and therefore the accuracy of measurement can be further increased.

A measuring method according to the third aspect of the present invention is a method for measuring a position of a target surface provided with plural portions for position determination. The portions for position determination have a convex shape on the target surface and each of the portions for position determination is configured such that a tangential plane of a surface of each portion for position determination at any point on the border line with the target surface forms a single plane, and tangential planes on the border lines of the plural portions for position determination are parallel to one another. The method includes the steps of determining positions of the border lines of the plural portions for position determination from an image of the target surface; and determining the position of the target surface from the positions of the border lines of the plural portions for position determination.

With the measuring method according to the present aspect, a position of the target surface can be easily measured using the image of the target surface.

DESCRIPTION OF EMBODIMENTS

Figure 1:
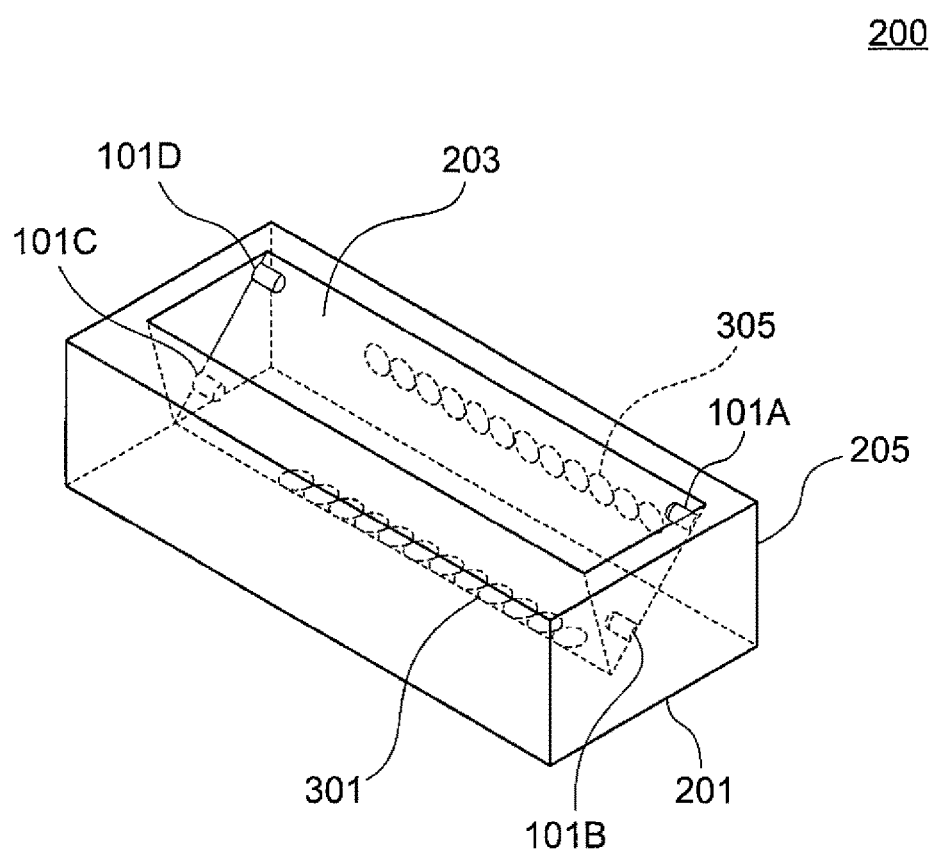
FIG. 1 illustrates an element according to an embodiment of the present invention.

FIG. 1 illustrates an element according to an embodiment of the present invention. The element according to the embodiment is an optical element 200 provided with a surface provided with lenses and a prism surface. The optical element 200 is provided with a reference plane 201, a plane 205 that is perpendicular to the reference plane 201 and a plane 203 that forms an angle (an acute angle) with the reference plane 201. The plane 203 is a prism surface. The reference plane 201 is provided with plural lenses 301 that are arranged in a straight line. Further, the plane 205 is provided with plural lenses 301 that are arranged in a straight line. Rays of light that travel in the direction perpendicular to the reference plane 201 and enters the plural lenses 301 that are arranged in a straight line on the reference plane 201 are reflected by the plane 203 in the optical element 200 and reach the plural lenses 305 that are arranged in a straight line on the plane 205. Thus, the optical element 200 is configured such that rays of light that travel in the direction perpendicular to the reference plane 201 and enters the plural lenses 301 that are arranged in a straight line on the reference plane 201 exit from the optical element 200 after having passed through the lenses 301 and the lenses 305. The plane 203 is provided with four position markers 101A 101B, 101C and 101D. Each of the four position markers 101A 101B, 101C and 101D has a convex shape on the plane 203. In general, position markers of an optical element are installed outside the area that is used as an optical surface on a surface of the optical element.

The four position markers 101A 101B, 101C and 101D are used to measure the angle that the plane 203 forms with the reference plane 201. The reference plane 201 corresponds to a first plane, and the plane 203 corresponds to a second plane. The angle that the first plane and the second plane form is greater than 0 degree and smaller than 90 degrees.

Figure 2:
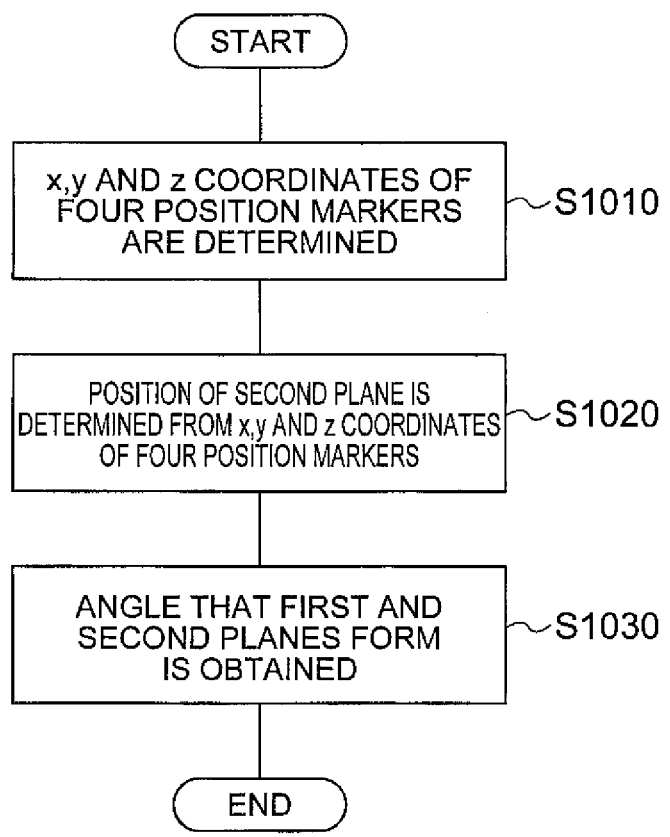
FIG. 2 is a flowchart for illustrating how to determine the angle between the first plane and the second plane by the use of the four position markers.

FIG. 2 is a flowchart for illustrating how to determine the angle between the first plane and the second plane by the use of the four position markers.

In step S1010 of FIG. 2, x, y and z coordinates of the four position markers are determined. An x-axis and a y-axis that are orthogonal to each other are determined in the first plane (reference plane) 201. A z-axis is determined such that it is orthogonal to the reference plane 201. How to determine x, y and z coordinates of the four position markers will be described in detail later. In general, a portion for determining x, y and z coordinates is referred to as a portion for position determination. In the present embodiment, the four position markers form four portions for position determination.

In step S1020 of FIG. 2, the position of the second plane is determined from the x, y and z coordinates of the four position markers. The position of the second plane may be determined by the method of least squares using the four sets of x, y and z coordinates.

In general, a position of a plane can be determined if the number of portions for position determination is three or more.

The four position markers 101A 101B, 101C and 101D are arranged such that spacing between them is great enough to locate the position of the second plane by the four sets of x, y and z coordinates. The four position markers may be arranged on the periphery of the second plane.

In step S1030 of FIG. 2, the angle that the first plane 201 and the second plane 203 form are obtained. The first plane 201 is contained in the xy plane, and the position of the second plane 203 has been determined with respect to the position of the first plane 201 by step S1020. Accordingly, the angle between the two planes can be obtained.

Further, in general, according to steps S1010 and S1020 of FIG. 2, a position of a plane can be determined by the use of position markers.

How to determine the x, y and z coordinates of the four position markers will be described below. By way of example, a method in which an image measuring system is used will be described below.

Figure 3:
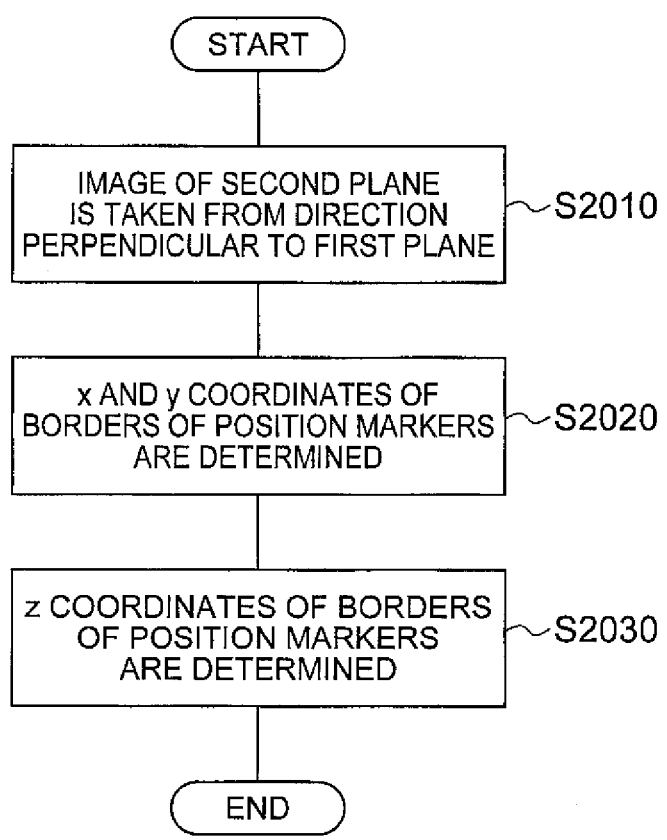
FIG. 3 is a flowchart for illustrating how to determine x, y and z coordinates of the four position markers.

FIG. 3 is a flowchart for illustrating how to determine x, y and z coordinates of the four position markers.

In step S2010 of FIG. 3, an image of the second plane 203 is taken from the direction perpendicular to the first plane (the reference plane) 201 with the image measuring system.

In step S2020 of FIG. 3, x and y coordinates of borders of the four position markers are determined using the obtained image in the following procedure. An arbitrary pixel in the image is defined as the origin of the coordinate system. In the image, the pixels that correspond to the borders of the four position markers 101A, 101B, 101C and 101D are determined. The x coordinates of the borders of the position markers are determined from the position in the x-axis direction of the pixel of the origin and the positions in the x-axis direction of the pixels corresponding to the borders of the position markers, and the y coordinates of the borders of the position markers are determined from the position in the y-axis direction of the pixel of the origin and the positions in the y-axis direction of the pixels corresponding to the borders of the position markers. The coordinates of the border of each position marker may be determined as average values of the coordinates of the plural pixels corresponding to the border. The positions of the borders, that is, the edges of the position markers are determined by detecting differences in density of pixels in the image. Accordingly, it is important that the borders of the position markers are clearly displayed in the image. Accuracy of measurement using an image is restricted by pixel size of an image sensor of an image measuring system. When an image is taken through a microscope, the accuracy corresponding to the pixel size is approximately 0.5 micrometers, by way of example.

In step S2030 of FIG. 3, z coordinates of the borders of the position markers are determined. The z coordinates of the borders of the position markers may be determined by the use of an auto-focus function of the image measuring system. They may also be determined by the use of a noncontact displacement sensor using laser or the like.

Figure 4:
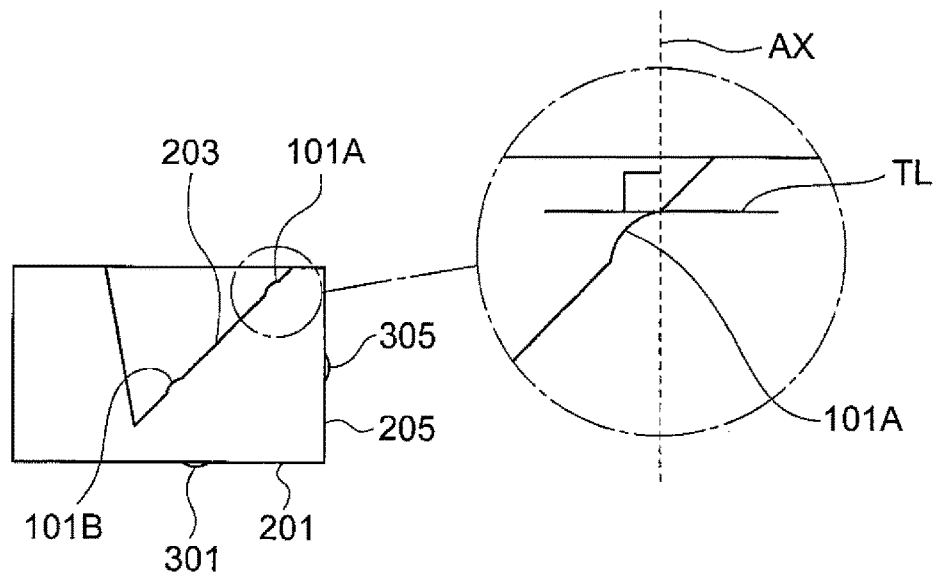
FIG. 4 shows a cross section of the element, the cross section being perpendicular to the first plane.

FIG. 4 shows a cross section of the element 200, the cross section being in the direction of the maximum angle of inclination of the second plane 203 and perpendicular to the first plane 201. The encircled drawing shows an enlarged view of the cross section in the direction of the maximum angle of inclination of the second plane 203 and perpendicular to the first plane 201, of the position marker 101A and its vicinity. A line AX shows a straight line that passes through the border between the position marker 101A and the second plane 203 and is perpendicular to the first plane 201. A line TL shows the tangential plane of the surface of the position marker 101A at the border between the position marker 101A and the second plane 203. The surface of the position marker 101A at the border may be a flat surface or a curved surface. In general, when a position marker is installed on a plane, the border line between the position marker and the plane should preferable be a straight line. In FIG. 4, the border is represented as the point and the tangential plane is represented as the line. The line TL is orthogonal to the line AX. That is, each tangential plane (the line TL in FIG. 4) of the surface of the position marker 101A at any point on the border line between the position marker 101A and the second plane 203 forms a single plane that is orthogonal to the line AX and parallel to the first plane 201. The border line between the position marker 101A and the second plane 203 is contained in the tangential plane. This border line that is represented as the point of intersection of the line AX and the line TL in FIG. 4 is a straight line that is perpendicular to the cross section that is shown in FIG. 4 and parallel to the first plane 201. The angle that the tangential plane and the second plane 203 form is equal to the angle that the first plane 201 and the second plane 203 form.

Figure 5:
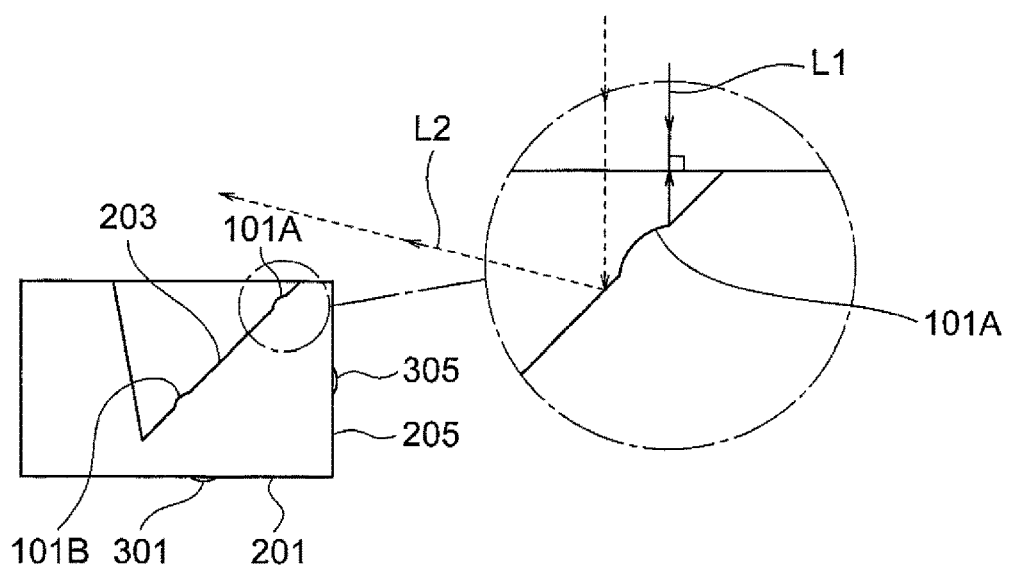
FIG. 5 shows a cross section of the element, the cross section being perpendicular to the first plane, and paths of rays of light illuminating the position marker.

FIG. 5 shows a cross section of the element 200, the cross section being in the direction of the maximum angle of inclination of the second plane 203 and perpendicular to the first plane 201, and paths of rays of light illuminating the position marker. The encircled drawing shows an enlarged view of the cross section in the direction of the maximum angle of inclination of the second plane 203 and perpendicular to the first plane 201, of the position marker 101A and its vicinity. In the encircled drawing, paths of rays of light illuminating the position marker are shown. When an image that is parallel to the first plane 201 is taken with the image measuring system, the second plane 203 is illuminated by light travelling in the direction that is perpendicular to the first plane 201. As described above, the tangential plane (the line TL in FIG. 4) of the surface of the position marker 101A at the border between the position marker 101A and the second plane 203 is made parallel to the first plane 201. Accordingly, among the rays of light travelling in the direction perpendicular to the first plane 201 for illumination, a ray L1 of light that has reached the surface of the position marker 101A in the vicinity of the border between the position marker 101A and the second plane 203 is reflected such that it travels in the direction perpendicular to the first plane 201 towards the image measuring system. Among the rays of light travelling in the direction perpendicular to the first plane 201 for illumination, a ray L2 of light that has reached the second plane 203 is not reflected such that it travels in the direction towards the image measuring system, because the second plane 203 forms a predetermined angle with the first plane 201. Accordingly, in the image of the image measuring system, the position of the border between the position marker 101A and the second plane 203 is clearly displayed. The predetermined angle, that is, the angle that the first plane 201 and the second plane 203 form, is preferably in a range from 20 degrees to 70 degrees and more preferably in a range from 30 degrees and 60 degrees.

In general, provided that an angle that the tangential plane of the surface of a position marker at the border line between the position marker and the second plane and the second plane form is in a range from 20 degrees to 70 degrees and more preferably in a range from 30 degrees to 60 degrees, the tangential plane need not be parallel to the first plane 201. In this case, the angle that is opposite a light source is in a range from 110 degrees to 160 degrees and more preferably in a range from 120 degrees to 150 degrees. The tangential planes of the plural position markers should preferably be parallel to one another. Provided that the tangential planes of the plural position markers are parallel to one another and the acute angle that the tangential planes and the second plane form is in a range from 20 degrees to 70 degrees and more preferably in a range from 30 degrees and 60 degrees, an image in which the positions of the borders between the position markers and the second plane are clear can be taken when the direction from which the image is taken and the direction of illumination of light are appropriately determined.

Figure 6:
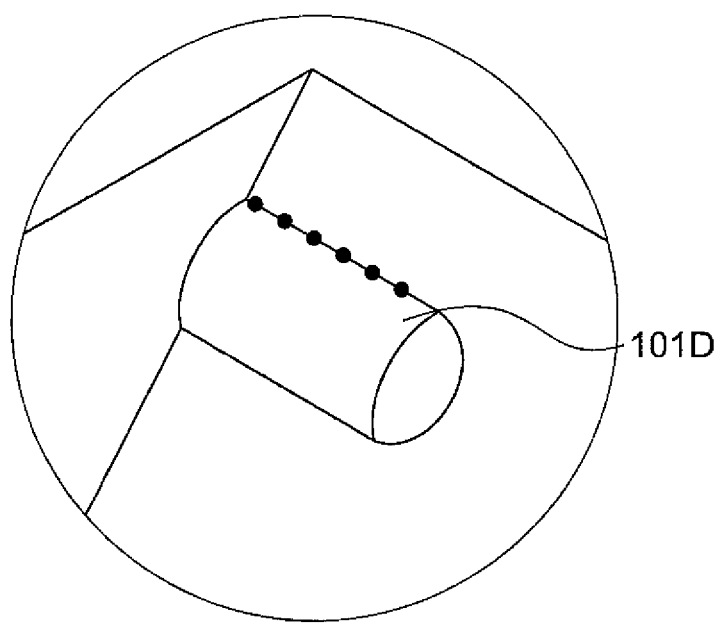
FIG. 6 shows an enlarged view of the position marker.

FIG. 6 shows an enlarged view of the position marker 101D. As shown in FIG. 6, the border line between the position marker 101D and the second plane 203 is made parallel to the first plane 201. That is, the z coordinate of any point at the border line shows a fixed value. Further, the length of the border line is such that it contains 5 or more points of measurement that are represented as black dots. The size of a point of measurement corresponds to the size of a pixel of the image measuring system. By way of example, the length of the border line ranges from 0.1 millimeters to 3.0 millimeters. Further, when the surface including the border line of a position marker is formed as a curved surface, the curvature radius of the surface of the position marker on the border line is preferably from 0.03 millimeters to 0.2 millimeters. Provided that the curvature radius falls the range described above, the border between the position marker and the second plane is clearly displayed in an image. Although the description given above and FIG. 6 are targeted to the position marker 101D, the description is also applicable to the other position markers.

According to the embodiment of the present invention, a position of a border line represented by plural pixels are clearly displayed in an image of an image measuring system so that x and y coordinates of the border line can be easily recognized. Further, at plural points of measurement that correspond to plural pixels, plural sets of x, y and z coordinates are determined, and the average value of the x coordinates, an average value of the y coordinates and the average value of the z coordinates are defined respectively as x, y and z coordinates of the position marker. Thus, variations in measurement values can be expected to be reduced by the use of the plural sets of x, y and z coordinates.

A shape of a position marker will be described below. The description will be given for a case that an element is made of plastic (synthetic resin), and the element provided with position markers is manufactured using a mold by injection molding.

Figure 7A:
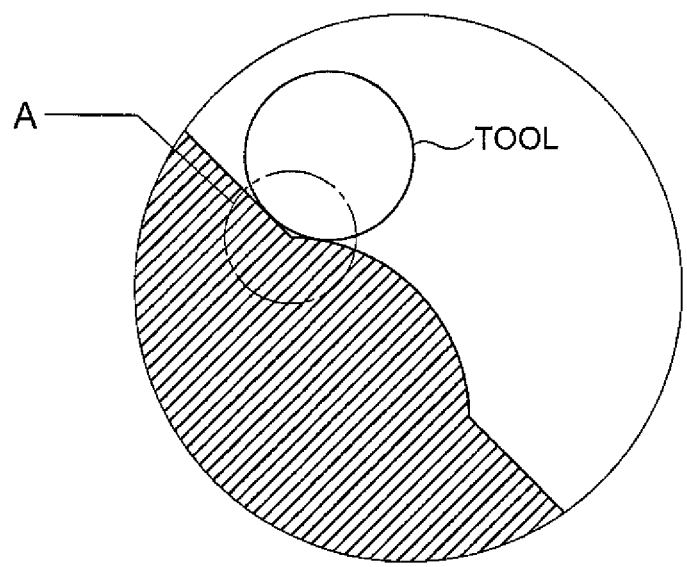
FIGS. 7A and 7B show a shape of a mold for a position marker having a concave shape.
Figure 7B:
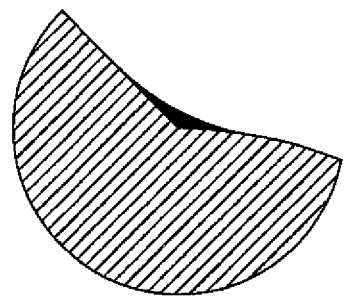

FIGS. 7A and 7B show a shape of a mold for a position marker having a concave shape. In FIGS. 7A and 7B, the hatched area represents the mold. FIG. 7B is an enlarged view of the portion marked with A in FIG. 7A. FIGS. 7A and 7B show a case that the position marker has a concave shape, and the mold has a convex shape. When the mold has a convex shape, an area that cannot be machined by a tool exists at the border of the position marker. As a result, the black area shown in FIG. 7B remains unmachined so that the border line of the position marker is not formed distinctly.

Figure 8A:
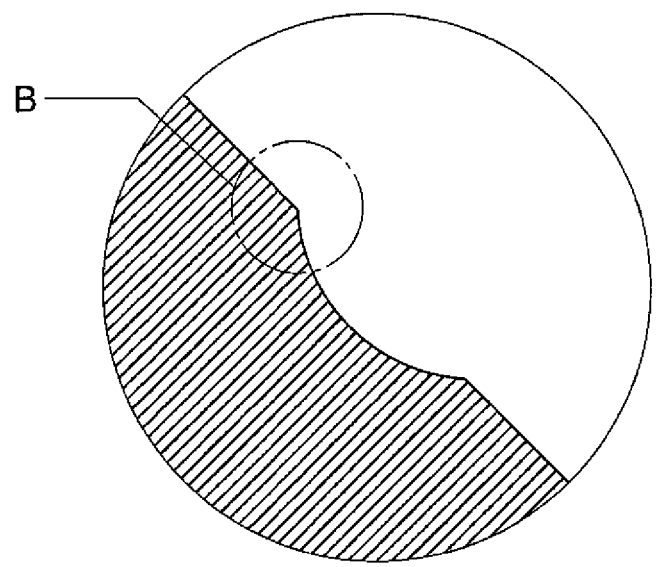
FIGS. 8A and 8B show a shape of a mold for a position marker having a convex shape.
Figure 8B:
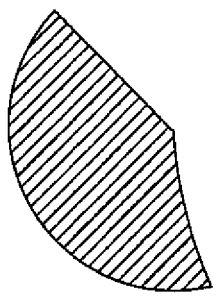

FIGS. 8A and 8B show a shape of a mold for a position marker having a convex shape. In FIGS. 8A and 8B the hatched area represents the mold. FIG. 8B is an enlarged view of the portion marked with B in FIG. 8A. FIGS. 8A and 8B show a case that the position marker has a convex shape, and the mold has a concave shape. When the mold has a concave shape, an area that cannot be machined by a tool does not exist at the border of the position marker. As a result, the border line of the position marker is formed distinctly as shown in FIG. 8B.

Accordingly, when an element is manufactured by injection molding, a position marker should preferably have a convex shape on a surface where the position marker is installed.

Figure 9A:
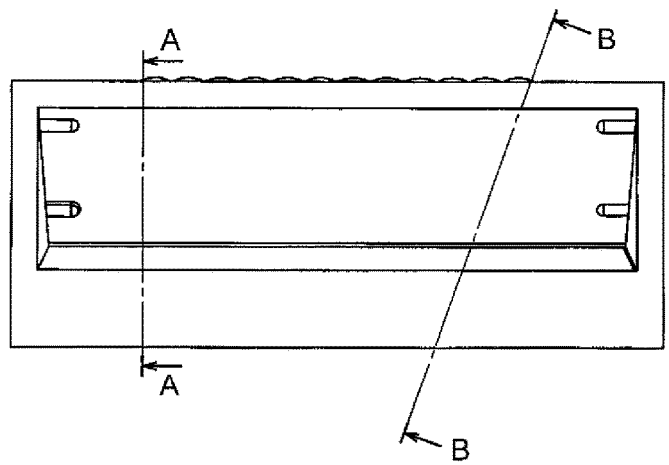
FIGS. 9A, 9B and 9C illustrate how to measure an angle formed by two planes of an element.
Figure 9B:
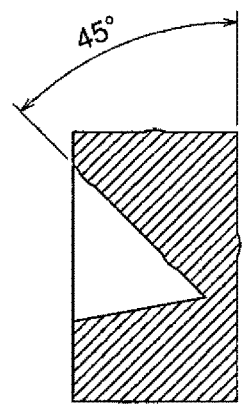
Figure 9C:
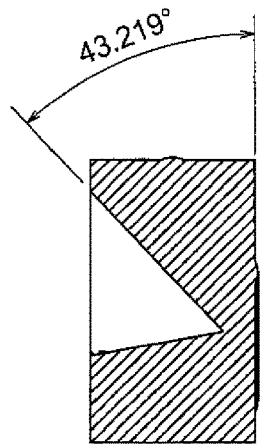

FIGS. 9A, 9B and 9C illustrate how to measure an angle formed by two planes of an element. FIG. 9A shows positions where angles are measured. The positions of cross sections marked with dot and dash lines AA and BB are positions of measurement. FIG. 9B shows a cross section of the element at the dot and dash line AA, and when an angle formed by the two planes is measured in this cross section, the angle is 45 degrees. FIG. 9C shows a cross section of the element at the dot and dash line BB, and when an angle formed by the two planes is measured in this cross section, the angle is 43.219 degrees. Thus, in a conventional method in which an angle is measured in a cross section of an element, the angle varies depending on a position of measurement (a direction of measurement). On the other hand, in the method according to the present invention, coordinates of positions of two planes are determined, and therefore the problem of variations described above will not occur.

Table 1 shows measurement values of an angle of a prism plane, which are obtained by a conventional method in which an angle is measured in a cross section of an element and the method according to the present invention. Numbers "1", "2" and "3" represent the first, the second and the third measurement values, respectively. The unit of angle is degree. "Average value" in Table 1 represents the average value of the three measurement values. The values of "6σ" in Table 1 are obtained by estimating values of σ (standard deviation) from the three measurement values and multiplying the values by 6. CP represents a process capability index that is a ratio of variation to the tolerance range. The values of CP in Table 1 are obtained by dividing the tolerance range by 6σ.

TABLE 1

|  | Tolerance range | 1 | 2 | 3 | Average value | 6σ | CP |
| --- | --- | --- | --- | --- | --- | --- | --- |
| Present invention | 0.6 | 44.99 | 45.03 | 44.92 | 44.98 | 0.35 | 1.72 |
| Prior art | 0.6 | 44.80 | 44.99 | 44.75 | 44.85 | 0.76 | 0.79 |

In general, it can be determined that variations in measurement will sufficiently fall within the tolerance range if the value of CP is 1.33 or more. Accordingly, it is determined that a tolerance range of 0.6 degrees, that is, measuring accuracy of ±0.3 degrees can be obtained by the method according to the present invention.

Figure 10:
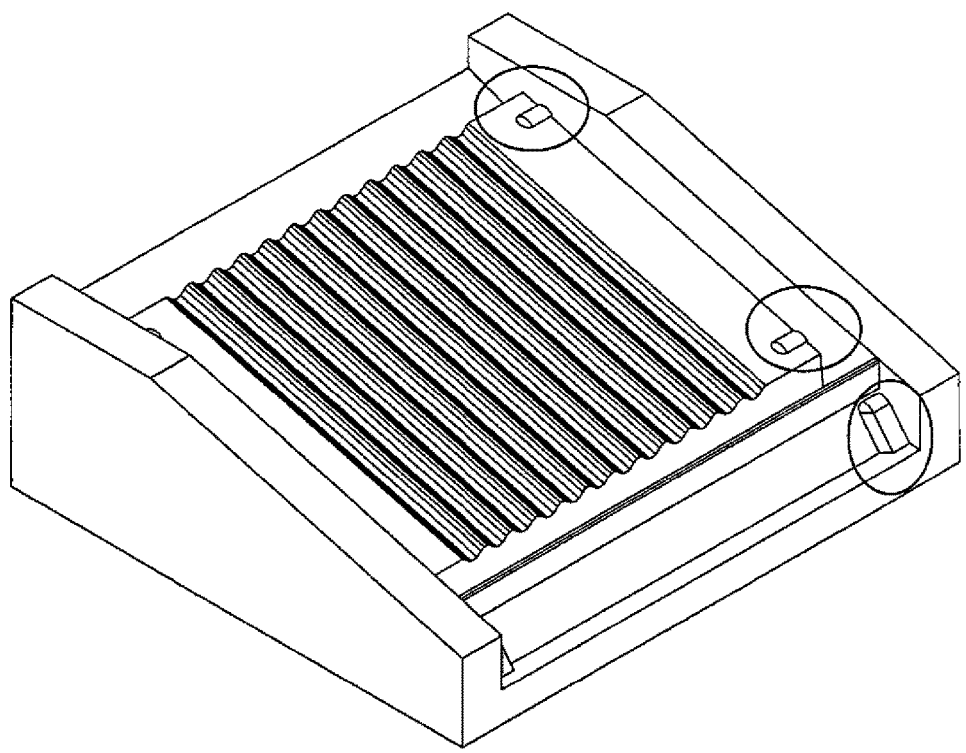
FIG. 10 shows an element provided with position markers on a surface provided with plural grooves for arranging optical fibers.

FIG. 10 shows an element provided with position markers on a surface provided with plural grooves for arranging optical fibers. In FIG. 10, position markers are encircled. In general, the present invention can be applied to elements provided with a prism plane, an entrance surface and an exit surface on which lenses are shaped, an entrance surface and an exit surface that are at an angle with each other, such a surface provided with plural grooves for arranging optical fibers as shown in FIG. 10, or the like.

In the embodiments described above, a single position marker forms a single portion for position determination. In general, a single position marker may have plural portions for position determination.

Figure 11A:
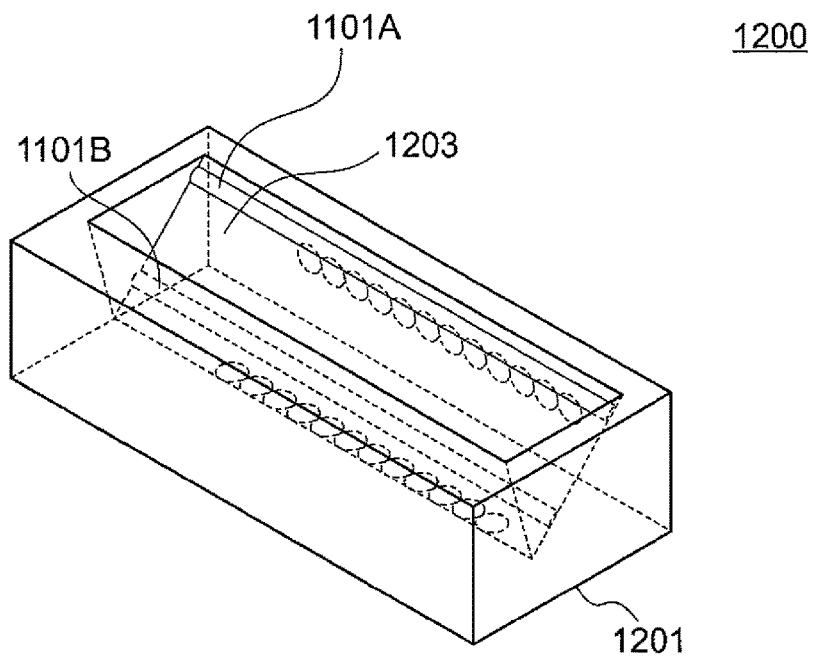
FIGS. 11A and 11B show an element according to another embodiment of the present invention.
Figure 11B:
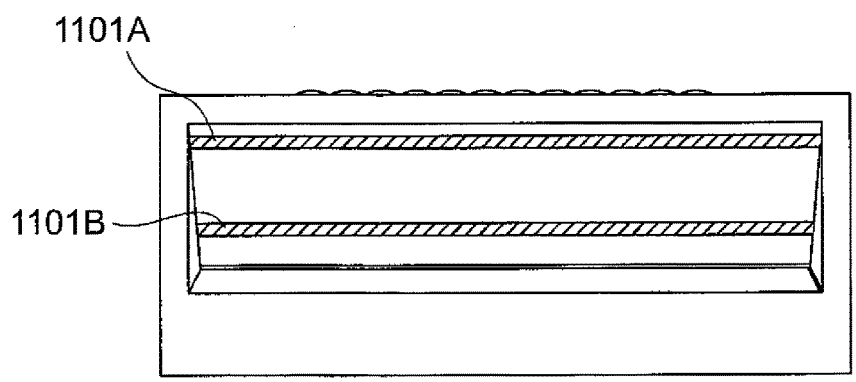

FIGS. 11A and 11B show an element 1200 according to another embodiment of the present invention. FIG. 11A is a perspective view of the element 1200, and FIG. 11B is a plan view of the element 1200. The element 1200 is provided with two linear position marker 1101A and 1101B on a plane 1203. By using at least three positions including a position on the position marker 1101A and a position on the position marker 1101B as portions for position determination, the angle formed by the plane 1203 and a plane 1201 can be measured.

Further, in general, a position of a surface including a curved surface can be determined by the present invention. A surface the position of which is determined is defined as a surface A. Plural portions for position determination are provided on the surface A. Each of the portions for position determination has a convex shape on the surface A, and is configured such that each tangential plane of the surface of each portion for position determination at any point on the border line with the surface A forms a single plane. Further, the plural portions for position determination are configured such that the tangential planes of the plural portions for position determination are parallel to one another. At each point on the border line, the angle formed by the tangential plane of a portion for position determination and the tangential plane of the surface A should preferably range from 20 degrees to 70 degrees, and more preferably from 30 degrees to 60 degrees. When the plural portions for position determination are illuminated with light in a direction that is substantially perpendicular to the tangential planes of the plural portions for position determination, and an image is taken, the coordinates of the border lines of the portions for position determination can be obtained by the method shown in the flow chart of FIG. 3. Using the coordinates of the border lines of the portions for position determination thus obtained, the position of the surface A can be determined. By way of example, when the surface A is spherical, the center of the sphere can be determined as the point that is equidistant from three portions for position determination.

What is claimed is:

1. An element having a first surface and a second surface, the second surface being at an angle with the first surface of the element, wherein:
   the second surface is provided with at least three portions for position determination thereon, the portions for position determination being arranged such that spacing between the portions for position determination is great enough to locate the second surface, and wherein each of the portions for position determination has a convex shape on the second surface and is configured such that a tangential plane of a surface of each portion for position determination at any point on a border line with the second surface and the surface forms a single plane, an angle formed by the tangential plane and the second surface is in a range from 20 degrees to 70 degrees, and wherein the tangential planes on the border lines of the at least three portions for position determination are parallel to one another.

2. The element according to claim 1, wherein the tangential planes are configured to be made parallel to the first surface.

3. The element according to claim 1, wherein the portions for position determination are arranged on the periphery of the second surface.

4. The element according to claim 1, provided with four portions for position determination.

5. The element according to claim 1, used for optical applications.

6. The element according to claim 5, wherein at least one of the first surface and the second surface comprises a prism surface.

7. The element according to claim 5, wherein at least one of the first surface and the second surface is provided with a lens thereon.

8. The element according to claim 5, wherein at least one of the first surface and the second surface comprises a surface for installing an optical fiber.

9. The element according to claim 1, further comprising at least three position markers, each position marker corresponding to a single portion for position determination.

10. The element according to claim 9, wherein a length of the border line of each position marker is from 0.1 millimeters to 3.0 millimeters and a length of each position marker in the direction of the border line is equal to the length of the border line.

11. The element according to claim 9, wherein a surface including the border line of each position marker comprises a curved surface, and a radius of curvature of the surface at the border line is in a range from 0.03 millimeters to 0.2 millimeters.

12. The element according to claim 1, further comprising at least two position markers including at least one position marker corresponding to plural portions for position determination.

13. A measuring method for measuring a position of a target surface provided with plural portions for position determination,
wherein the portions for position determination have a convex shape on the target surface and each of the portions for position determination is configured such that a tangential plane of a surface of each portion for position determination at any point on the border line with the target surface forms a single plane, and tangential planes on the border lines of the plural portions for position determination are parallel to one another, and
wherein the method includes the steps of:
determining positions of the border lines of the plural portions for position determination from an image of the target surface; and
determining the position of the target surface from the positions of the border lines of the plural portions for position determination.

14. A measuring method for measuring a position of a surface of an element, using the measuring method for measuring a position according to claim 13, the surface of the element being the target surface, wherein
the surface of the element is provided with at least three portions for position determination thereon, the portions for position determination being arranged such that spacing between the portions for position determination is great enough to locate the surface of the element.

15. The method for measuring a position according to claim 14, wherein an angle that the tangential planes form with the surface of the element is in a range from 20 degrees to 70 degrees.

16. A method for measuring an angle in an element having a first surface and a second surface, the second surface being at an angle with the first surface, using the measuring method for measuring a position according to claim 13,
wherein the second surface that is the target surface is provided with at least three portions for position determination thereon, the portions for position determination being arranged such that spacing between the portions for position determination is great enough to locate the second surface,
wherein the method comprises:
determining positions of the border lines of the at least three portions for position determination from an image of the second surface; and
determining the angle between the first surface and the second surface using the positions of the border lines of the at least three portions for position determination.

17. The method for measuring an angle according to claim 16, wherein an angle that the tangential planes form with the second surface is in a range from 20 degrees to 70 degrees.

18. The method for measuring an angle according to claim 16, wherein the tangential planes are configured to be made parallel to the first surface.

19. The method for measuring an angle according to claim 16, wherein the position of the border line of each of the at least three portions are obtained using plural pixels in the image.

* * * * *